(12) United States Patent
Hasemann

(10) Patent No.: US 6,707,445 B1
(45) Date of Patent: Mar. 16, 2004

(54) INPUT DEVICE

(75) Inventor: Joerg-Michael Hasemann, Thedinghausen (DE)

(73) Assignee: Robert Bosch GmbH, Stuttgart (DE)

( * ) Notice: Subject to any disclaimer, the term of this patent is extended or adjusted under 35 U.S.C. 154(b) by 82 days.

(21) Appl. No.: 09/699,788

(22) Filed: Oct. 30, 2000

(30) Foreign Application Priority Data

Oct. 29, 1999 (DE) .......................................... 199 52 087

(51) Int. Cl.⁷ ................................................. G09G 5/08
(52) U.S. Cl. ...................... 345/157; 345/160; 345/161; 345/164; 455/556
(58) Field of Search ............................ 345/156, 8, 102, 345/157, 160, 161, 164; 128/925; 455/556; 341/20

(56) References Cited

U.S. PATENT DOCUMENTS

| 5,280,265 | A | * | 1/1994 | Kramer et al. | ............... 128/925 |
| 5,596,339 | A | * | 1/1997 | Furness et al. | ................. 345/8 |
| 5,894,301 | A | * | 4/1999 | Seffernick | .................... 345/160 |
| 6,029,072 | A | * | 2/2000 | Barber | ........................ 455/556 |
| 6,073,034 | A | * | 6/2000 | Jacobsen et al. | ............ 345/102 |
| 6,304,840 | B1 | * | 10/2001 | Vance et al. | .................. 341/20 |
| 6,331,849 | B1 | * | 12/2001 | VandenBoom | .............. 345/157 |

\* cited by examiner

Primary Examiner—Steven Saras
Assistant Examiner—Uchendu O. Anyaso
(74) Attorney, Agent, or Firm—Kenyon & Kenyon

(57) ABSTRACT

An input device for controlling and/or selecting objects on a display unit has at least one bending sensor, and the bending sensor is connected to the longitudinal edge of a flexible wire.

11 Claims, 3 Drawing Sheets

INPUT DEVICE

FIELD OF THE INVENTION

The present invention relates to an input device for controlling and/or selecting objects on a display unit having at least one bending sensor.

BACKGROUND INFORMATION

Input devices are used for moving, controlling and selecting objects such as a cursor or switch buttons (icons) on the display unit of an electronic device such as a computer or for input of commands. Keyboards are well known for input of character strings and for controlling the cursor by way of arrow keys. In addition, there is the widely used mouse, where a ball is moved over a surface. The position of a cursor is determined from the direction and speed of movement of the ball. In the case of a track ball, a ball is moved by hand and is not moved over a surface as in the case of a mouse. Other input devices include light pens for optical analysis of the position of the light pen on a display unit and joysticks for control by measuring the angle of tilt of a lever.

Three-dimensional pointing devices such as control balls and control gloves are well known for digitizing three-dimensional movements. With such three-dimensional pointing devices, a cursor can be moved in a space displayed in perspective on the display unit. For example, bending sensors running parallel to the user's fingers, their bending radius changing due to the angle of bending of the respective finger, are incorporated into the control gloves. For example, the bending sensors may be implemented as variable resistors whose resistance changes as a function of the bending executed on the bending sensor. Such bending senors are also used in robotics for collision detection.

Another embodiment of bending sensors would be wire strain gauges which are used for measuring force in robotics, for example.

SUMMARY OF THE INVENTION

An object of the present invention was to create an inexpensive input device that can be used for mobile terminal devices in particular and will be easy to operate.

This object is achieved by the input device according to the present invention, where a bending sensor is connected to the longitudinal edge of a flexible wire.

In this case, only one-dimensional measurements are performed, i.e., only "up" or "down." Such an elongated input device may be attached to the mobile terminal and is easy to operate. A direction of movement is defined by specifying a preferential direction of bending of the flexible wire. For example, the displacement of a cursor in this direction of movement is determined by the bending radius and by the resistance of the bending sensor which changes as a function of the bending radius.

Two bending sensors are preferably arranged at a right angle to one another and connected to the longitudinal edges of the flexible wire, running parallel to one another along their longitudinal axes. The flexible wire should have a rectangular cross-section, so that the bending sensors can be attached better to the wire. In this way, the X axis would be defined by the first bending sensor and the Y axis would be defined by the second bending sensor. In this embodiment, the position is determined in a Cartesian coordinate system.

As an alternative, the flexible wire may be rotatably mounted on one end, with a sensor being provided to determine the angle of rotation of the flexible wire. In this embodiment, the displacement of a cursor is determined in the polar coordinate system. The distance of the cursor from the center point here is proportional to the deflection of the bending sensor. The coordinate angle is determined from the angle of rotation of the flexible wire.

The sensor for determining the angle of rotation may be a rotary position transducer, a pulse generator, a coding wheel or a similar device.

It is advantageous if the flexible wire is a spring wire so that it can automatically return to a zero position.

In addition, it is advantageous if at least one selector key is mounted on the free end of the flexible wire. Control signals for activating a command linked to a selected object, for example, can be triggered using this selector key.

One or more collector rings may be used to contact keys that might be provided for the case when an embodiment according to the present invention is used.

For example, the display unit may be a virtual retina display installed in a mobile terminal such as a mobile telephone. When using a mobile telephone, it is difficult to operate input devices provided on the mobile telephone while using the telephone. Due to the elongated input device, the point of action is shifted so far away from the mobile telephone that the input device can be operated easily and conveniently.

DETAILED DESCRIPTION

Figure 1:
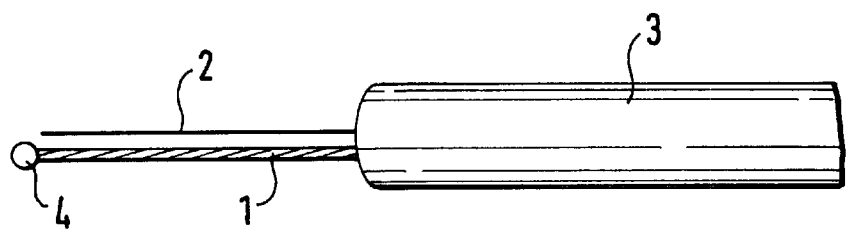
FIG. 1 shows an input device with a bending sensor on the longitudinal edge of a flexible wire in combination with a mobile terminal.

FIG. 1 shows an embodiment of the input device according to the present invention having a flexible wire 1 and a bending sensor 2 connected to the longitudinal edge of flexible wire 1 and running parallel to flexible wire 1. One end of bending sensor 2 and flexible wire 1 is fixedly attached to a mobile terminal 3. For example, a spring wire or a similar element day be used as flexible wire 1. The spring wire should be rectangular and should have a preferential bending direction about the longitudinal edge to which bending sensor 2 is attached. The control and or selection of objects such as switch symbols and icons on a display unit takes place as a function of the bending radius of bending sensor 2. A selector key 4 is provided on the other end of the spring wire to trigger actions according to the known mouse keys of a personal computer. After a cursor has been moved to a selectable object with the help of the input device, for example, the object can be selected with the help of selector key 4, and an application linked to the object can be started.

Figure 2:
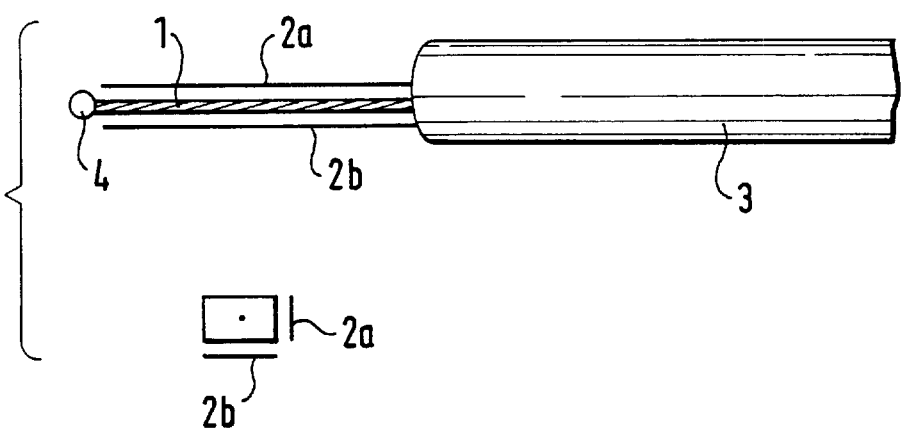
FIG. 2 shows two bending sensors arranged at a right angle on the longitudinal edge of a flexible wire, shown as a side view and a top view.

FIG. 2 shows a preferred embodiment, which has two preferential bending directions (X and Y directions) into which the input device can be moved. Two bending sensors 2a and 2b are mounted at a right angle on the longitudinal edges of flexible wire 1 for this purpose. The free end of flexible wire 1 and bending sensors 2a and 2b are fixedly connected to mobile terminal 3. A deflection of bending sensor 2a in X direction corresponds to movement of the cursor on the display unit also in X direction. Accordingly, the movement of the cursor in Y direction is in proportion to the deflection of the second bending sensor 2b. In the resting position, when flexible wire 1 is not deflected, the cursor is in a starting position on the display unit.

Figure 3:
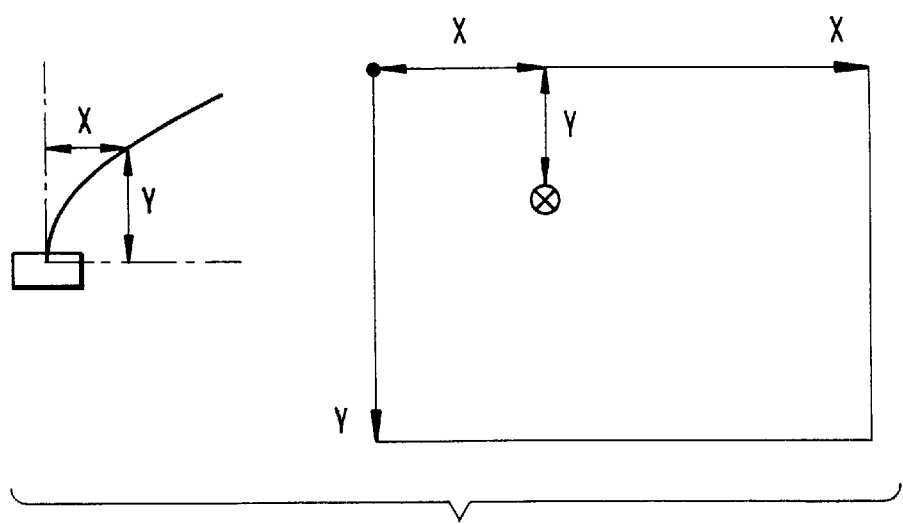
FIG. 3 shows a diagram for determining the cursor position on a display unit by measuring the bending of the bending sensor in Cartesian coordinates.

In conjunction with FIG. 3, it is clear that the cursor position is determined with the help of Cartesian coordinates using the input device illustrated in FIG. 2 by measuring the deflection in X and Y directions relative to the resting position and determining the cursor position relative to that.

Figure 4:
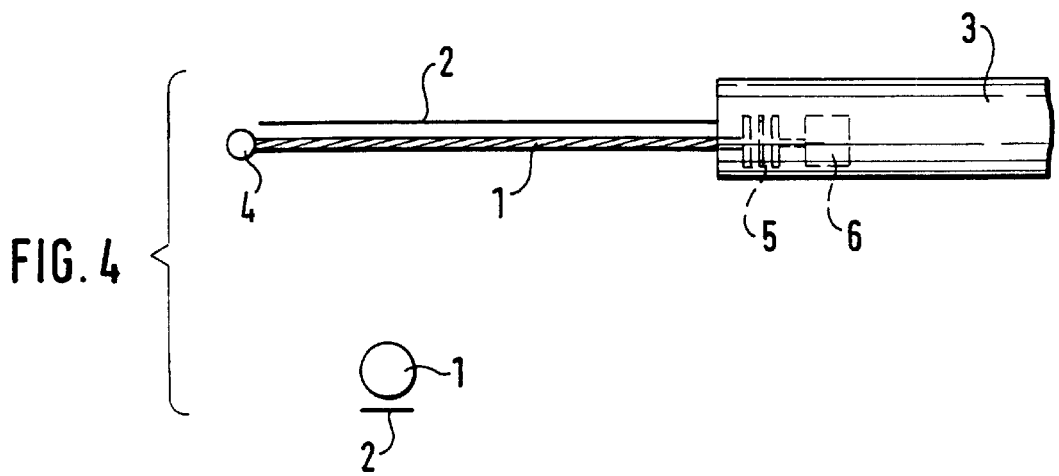
FIG. 4 shows a rotatably mounted input device in a side view and a top view.

FIG. 4 shows another embodiment of the input device, where flexible wire 2 is rotatably mounted on the mobile terminal. It can be seen from this top view that a single bending sensor 2 is provided and is mounted as described above on the longitudinal edge of flexible wire 1. The angle of rotation of flexible wire 1 is measured with respect to mobile terminal 3 using an absolute and incremental rotary position transducer 6. There should also preferably be an indication of the zero position for establishing a starting angle. However, the angle of rotation may also be measured with a pulse generator and/or a coding wheel. The selector key(s) is/are contacted by one or more collector rings 5.

Figure 5:
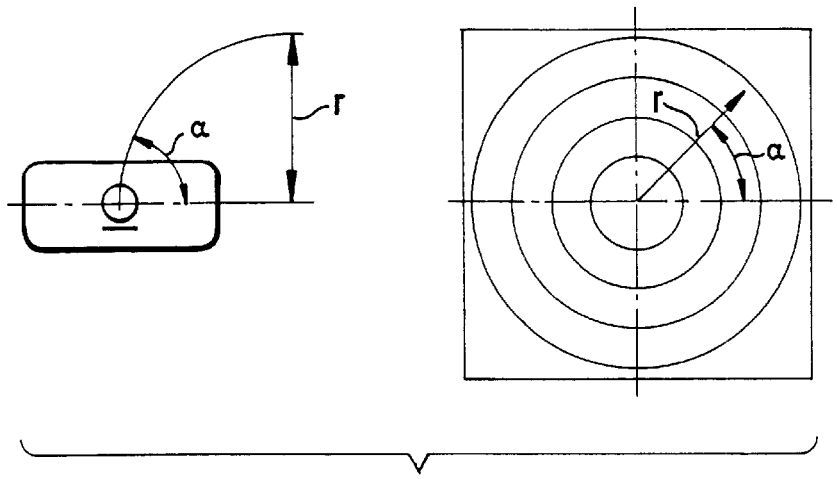
FIG. 5 shows a diagram for determining the cursor position on a display unit by measuring the bending of the bending sensor and the angle of rotation of the input device.

It is clear from FIG. 5 that in the case of the input device illustrated in FIG. 4, the cursor position is determined with the help of a polar coordinate system. The direction is determined by the angle measured by rotary position transducer 6. However, the vector length is determined by the bending radius of bending sensor 2.

The bending radius is measured preferably with a bending sensor 2 having variable resistors whose resistance changes as a function of the bending imparted to bending sensor 2.

Figure 6:
FIG. 6 shows an example of using the input device in conjunction with a mobile telephone.

The input device may be used in particular in conjunction with a mobile telephone 7 whose keyboard cover flap 8 contains a virtual retina display (VRD), as diagramed in FIG. 6. Virtual retina displays (VRD) are very compact, miniature display devices where images are projected directly onto the user's retina. There is no display in the traditional sense, and no real image is generated.

It can also be seen from FIG. 6 that the use position when using mobile telephones 7 is so unfavorable that no precisely controlled fine motor movements are possible, and thus traditional input devices cannot be used. Traditional input devices therefore require a larger mechanical system to permit greater deflections based on the larger movement sequences. However, this requires too much weight and space. This disadvantage can be eliminated by input devices mounted on mobile telephone 7. To this end, the input device points away from mobile telephone 7 because of its elongated design, so the user can grip the end of the input device and thus can control a deflection, of a cursor, for example. The user's eyes here are directed at the virtual retina display (VRD), so a representation with selectable objects is projected onto his/her retina. With the help of the input device, the user can control a cursor projected onto his/her retina by rotating and bending bending sensor 2 and flexible wire 1 and thus can prompt corresponding commands.

Flexible wire 1 may also be designed to function as an antenna at the same time, and the input device illustrated here may be inserted like a telescope into mobile terminal 3.

What is claimed is:

1. An input device for one of controlling and selecting an object on a display unit, comprising:

a flexible wire, at least one bending sensor connected to a longitudinal edge of the flexible wire; and a sensor for determining an angle of rotation of the flexible wire, wherein the flexible wire is rotationally mounted at one end, and wherein the sensor for determining the angle of rotation includes at least one collector ring and a rotary position transducer for determining the angle of rotation.

2. The input device according to claim 1, wherein:

the at least one bending sensor includes a first bending sensor and a second bending sensor, the first bending sensor and the second bending sensor are arranged at a right angle to one another, the first bending sensor is connected to the longitudinal edge of the flexible wire, the second bending sensor is connected to another longitudinal edge of the flexible wire, and the first bending sensor and the second bending sensor respectively extend along a first longitudinal axis of the first bending sensor and a second longitudinal axis of the second bending sensor that is parallel to the first longitudinal axis.

3. The input device according to claim 1, wherein:

the flexible wire is fixedly mounted at one end.

4. The input device according to claim 1, wherein:

the flexible wire includes a rectangular cross-section and a preferential bending direction.

5. The input device according to claim 1, wherein:

the flexible wire includes a spring wire.

6. The input device according to claim 1, further comprising:

at least one selector wheel arranged on a free end of the flexible wire.

7. The input device according to claim 1, wherein:

the display unit is a virtual retina display.

8. The input device according to claim 1, wherein:

the input device is insertable into a housing.

9. The input device according to claim 1, wherein:

the input device is for a mobile telephone, and the input device is designed as an antenna.

10. The input device according to claim 1, wherein:

the at least one bending sensor includes a first sensor and a second sensor, the first sensor is situated on a first surface of the flexible wire, the second sensor is situated on a second surface of the flexible wire, and the first surface and the second surface are at right angles to each other.

11. An input device for one of controlling and selecting an object on a display unit, comprising:

a flexible wire;

at least one bending sensor connected to a longitudinal edge of the flexible wire; and sensor for determining an angle of rotation of the flexible wire, wherein the flexible wire is rotationally mounted at one end, and wherein the sensor for determining the angle of rotation includes a pulse generator for determining the angle of rotation.

* * * * *

UNITED STATES PATENT AND TRADEMARK OFFICE
CERTIFICATE OF CORRECTION

PATENT NO. : 6,707,445 B1  
DATED : March 16, 2004  
INVENTOR(S) : Joerg-Michael Hasemann It is certified that error appears in the above-identified patent and that said Letters Patent is hereby corrected as shown below:

<u>Column 4,</u>  
Line 61, change "sensor for determining" to -- a sensor for determining --

Signed and Sealed this

Twelfth Day of October, 2004

JON W. DUDAS  
*Director of the United States Patent and Trademark Office*